(12) United States Patent
Balduin et al.

(10) Patent No.: US 8,327,667 B2
(45) Date of Patent: Dec. 11, 2012

(54) GLASS-BENDING AND COOLING METHOD AND DEVICE COMPRISING TWO SUPPORT TRAINS

(75) Inventors: Michael Balduin, Alsdorf (DE); Michael Labrot, Aachen (DE); Hubert Havenith, Wurselen (DE); Karl-Josef Ollfisch, Aachen (DE); Herbert Radermacher, Raeren (BE); Guenther Schall, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 1098 days.

(21) Appl. No.: 11/813,690

(22) PCT Filed: Jan. 11, 2006

(86) PCT No.: PCT/FR2006/050014
§ 371 (c)(1),
(2), (4) Date: Feb. 13, 2008

(87) PCT Pub. No.: WO2006/075117
PCT Pub. Date: Jul. 20, 2006

(65) Prior Publication Data
US 2008/0190143 A1 Aug. 14, 2008

(30) Foreign Application Priority Data
Jan. 13, 2005 (DE) .......... 10 2005 001 513

(51) Int. Cl.
*C03B 23/025* (2006.01)
(52) U.S. Cl. ............. 65/287; 65/289; 65/290; 65/291; 65/107; 65/106
(58) Field of Classification Search .......... 65/107, 65/106, 287, 289, 286, 290, 291, 102
See application file for complete search history.

(56) References Cited

U.S. PATENT DOCUMENTS

| 2,137,115 | A | * | 11/1938 | Marshall | 65/169 |
|---|---|---|---|---|---|
| 5,071,461 | A | | 12/1991 | Hirotsu et al. | |
| 5,651,805 | A | | 7/1997 | Kuster et al. | |
| 5,713,976 | A | * | 2/1998 | Kuster et al. | 65/106 |
| 5,992,178 | A | * | 11/1999 | Kuster | 65/24 |
| 6,009,726 | A | | 1/2000 | Funk | |
| 6,422,040 | B1 | * | 7/2002 | McMaster et al. | 65/106 |
| 2004/0107729 | A1 | * | 6/2004 | Fukami et al. | 65/25.4 |
| 2005/0166639 | A1 | | 8/2005 | Skeen et al. | |
| 2007/0039354 | A1 | * | 2/2007 | Ollfisch et al. | 65/106 |

FOREIGN PATENT DOCUMENTS
DE 103 14 266 6/2004
(Continued)

*Primary Examiner* — Matthew Daniels
*Assistant Examiner* — Yana Belyaev
(74) *Attorney, Agent, or Firm* — Oblon, Spivak, McClelland, Maier & Neustadt, L.L.P.

(57) ABSTRACT

A device and method for bending a glazing unit or plural glazing units positioned one on top of the other, with a first train of carriages, bearing transport supports and running between a loading zone in which at least one glazing unit is deposited on a transport support of a carriage and a transfer zone, a furnace section heating the glazing units to their bending temperature in their path towards the transfer zone, and a second train of carriages running between the transfer zone and a final cooling section with an unloading station, which is equipped with transport supports that differ from the transport supports of the first train of carriages.

20 Claims, 3 Drawing Sheets

FOREIGN PATENT DOCUMENTS

| | | | |
|---|---|---|---|
| DE | 10314266 B3 * | 6/2004 | |
| EP | 1 371 616 | 12/2003 | |
| JP | 57140325 | 8/1982 | |
| JP | 2000327352 | 11/2000 | |
| WO | 93 06052 | 4/1993 | |
| WO | 2004 087590 | 10/2004 | |

* cited by examiner

GLASS-BENDING AND COOLING METHOD AND DEVICE COMPRISING TWO SUPPORT TRAINS

The invention relates to a device for bending one or more glazing units positioned one upon the other and to a method for bending one or more glazing units positioned one upon the other.

GB 1 299 384 discloses a furnace plant for heating glazing units, particularly for bending motor vehicle windshields. The glazing units are deposited on molds in special molding carriages, the molding carriages being introduced one after the other into the tunnel furnace plant, which is made up of a succession of preheating heating—bending and cooling chambers. The molds on the molding carriages are introduced into the furnace at its entrance, transported along a path through the furnace and extracted from the furnace at the furnace exit. Thereafter, the molding carriages are once again returned to the entrance to the furnace outside the furnace. In this way, a train of carriages with molds moving in a closed circuit is formed. The furnace plant is characterized in that the preheating and heating—bending chambers are located separately from one another and in that a space is left between them where the temperature of the glazing units on the molds can be monitored and regulated.

U.S. Pat. No. 5,902,367 discloses a method for transporting carriages bearing molds into a glazing bending furnace. The bending furnace comprises preheating chambers and several heating chambers positioned after the preheating chambers and cooling chambers positioned under the preheating and bending chambers. The carriages bearing molds are first of all guided one after another along an upper track and transferred onto a lower track after the glazing units have been bent by means of gravity. The molding carriages are transported in stages, that is to say that they stop in the various chambers for a certain period of time and are then moved along in a train. The outward and return transportation of the carriages is within the bending furnace, but in opposite directions. According to U.S. Pat. No. 5,902,367 the mold-transporting carriages have, having been transferred onto the lower track, to be transmitted directly into a position under the first bending chamber or directly under the last preheating chamber, while the other mold-transporting carriages are stationary.

Lately, requirements on the precision of bent glazing units have been steadily tightening and what is more, glazing units with increasingly small radii of curvature are being demanded in order to meet these needs, it is necessary in most cases, in addition to bending merely under the effect of gravity as described in the aforementioned documents to perform a bending step using an additional bending tool. U.S. Pat. No. 5,713,976 discloses a method for bending a pair of glazing units using an additional bending tool, in which method the pair of glazing units is first of all prebent under the action of gravity on frame-shaped bending molds to such an extent that the glazing units rest with their edge region (peripheral region) entirely on the frame-shaped bending mold. They are then bent to the final desired shape using an upper bending mold with a solid surface in the central field situated inside the edge region, because the two glazing units are pressed against the bending mold with solid surface by suction around the peripheral sides.

The problem underlying the invention is that of affording an improved device and another method for bending glazing units.

According to the invention this problem is solved by the characteristics of the independent device claim as far as the device is concerned and by the characteristics of the independent method claim as far as the method is concerned. The claims dependent on the respective independent claims set out advantageous embodiments of the invention.

In the description which follows, and to make the invention easier to understand, it is possible for characteristics of the device to be mixed in with characteristics of the method.

Apart from a loading zone, a furnace section and a final cooling section, the device for bending a glazing unit further comprises, according to the invention, a transfer station and two independent trains of carriages, the individual carriages of which are equipped with transport supports that differ from one another.

In the loading station, which customarily lies outside the furnace section, the first transport supports of the first train of carriages can be loaded with glazing units. Next, the loaded carriages are transported into the furnace. The heating furnace is made up, as a general rule, of several heating chambers positioned one after the other, in which the glazing units are raised to their softening temperature needed for bending. The individual carriages reside in a heating chamber for a determined length of time before being transferred to the next heating chamber. The furnace often accommodates a new laden carriage in such a way that this carriage pushes the preceding carriages into their next position. When the carriages have reached the transfer station, the glazing units are taken up off their transport supports. Next, this carriage is ready to be loaded with a new glazing unit and can once again be sent to the loading station.

Between the transfer station and a final cooling section, which is used to cool the glazing units appropriately from their bending temperature to a lower temperature, there is a second train of carriages. This is equipped with second transport supports which differ from the transport supports of the first train of carriages. The carriages of the second train run between the transfer station, in which the second transport supports are loaded with glazing units, through the final cooling section and return once again to the transfer station. The final cooling section is equipped at its end with an off-loading station, in which the finished bent glazing units can be taken up off the transport supports.

By dividing a single train of carriages according to the prior art into two separate trains of carriages with mutually different transport supports according to the method of the invention, several advantages can be gained. On the one hand, having transport supports that differ according to the steps of the method executed before and after the transfer zone is, in terms of manufacture, a simpler and more economical solution than having to manufacture a combined tool positioned both on a carriage and on a base frame. Furthermore, these tools can be better suited to their respective functions without having to accept a compromise through lack of sufficient space or as a result of heat transfers that are slowed by bulky combined tools.

Finally, because the trains of carriages are divided, it is possible to build a furnace with two temperature zones. In the region of the first train of carriages, the carriages, the transport supports and the glazing units are heated to a relatively high glass-bending temperature whereas in the region of the second train of carriages the temperature is lower on average. The difference in temperature between the transport supports of the first and of the second trains of carriages lying respectively in the transfer zone is between 100° C. and 250° C. With the device of the invention it is thus possible on the one hand to save on energy because in actual fact the elements to be heated in the region of the first train of carriages do not need to be greatly cooled and then heated up again each time in order to allow the glazing units to solidify and set. Furthermore, the final cooling section and possibly also the furnace section can be shorter than in furnace plants of the prior art because smaller temperature differences need to be overcome.

Another desirable effect is also produced: the finished bent glazing units have, in particular, by comparison with glazing units manufactured in furnace plants according to the prior art, improved edge stress values. Because of the lower temperature of the second transport supports as the glazing units set in the transfer zone, the cooling in the edge region and in the central region of the glazing units can be more uniform because the carriages and the transport supports usually made of metal do not "heat up" the edge region of the glazing units to such an extent.

The transport supports on the individual carriages of the first train of carriages may exhibit any appropriate structure. For example, use may be made of concave molds or the glazing units may be placed on flexible wovens or knits with which they are equipped. According to the invention, use is, however, preferably made of frame-shaped bending molds in which the glazing units are supported only via their periphery or a short distance therefrom. During a path through the furnace section, the glazing units are heated to their bending temperature and therefore in their regions of contact with the frame-shaped bending mold come to hug the contour of the contact surface. This bending may, for example, continue until the glazing units have already achieved the final desired degree of curvature. However, when complex shapes of glazing unit needs to be obtained, it is often more advantageous merely to carry out a prebending under the action of gravity and for the glass not to be given its final form until a subsequent bending step. To do this, the first transport supports are then prebending molds, of which the surfaces for contact with the glazing units do not correspond to the final shape of the glass.

The frame-shaped bending molds positioned on the carriages of the first train of carriages for prebending or final bending may just as easily be rigid (their shape not varying during bending) as they may variable. Such a frame-shaped bending mold that can vary according to how the gravity bending is progressing is known for example from U.S. Pat. No. 5,660,609. This bending device for bending glazing units under gravity exhibits a prebending frame and a main bending frame which are positioned one with respect to the other in such a way that, by changing their position one relative to the other, the glazing unit prebent on the prebending frame is taken up by the main bending frame and bent thereon to its final shape. The prebending frame is formed of a closed rigid ring and, during the operation of transferring the glazing unit onto the main bending frame, is pivotably supported about an axis situated in the plane of symmetry. In this way, asymmetric action of the bending forces on the glazing unit is avoided.

According to a preferred embodiment of the device of the invention, the transport supports of the second train of carriages have, in their edge region (or peripheral region) the shape of the final bent glazing units. In this way, the bending profile is prevented from changing as the glazing units cool to below their deformation temperature. In the case of this type of transport support, good results have been obtained with frame-shaped rings which support the glazing units only at their edge regions (at the periphery). Of course, the use of other types of transport support is also possible, for example solid molds in which the contact surface corresponds to the total surface of the bent glazing units.

The term "carriage" in the first and second "trains of carriages" does not in any way restrict the invention to wheeled transport devices. Likewise, the expression "train of carriages" does not solely involve carriages coupled to one another. By contrast, "the carriages" may be moved by any appropriate technique, and may be driven individually, and isolated carriages or carriages in groups may be pushed or pulled through the furnace plant. The "carriages" may for example be supported by wheels air cushions or sliding pads. It is also possible for the transport supports to be fixed to a chassis engaged with a chain or deposited on a belt, so that the transport supports are moved by the movement of the chain or the belt. In the latter solution in particular the mass to be heated and/or cooled of the "carriages" can be greatly reduced so that such a construction displays advantages from an energy requirement standpoint.

Naturally, although the transport devices are theoretically independent, the transport operations on the two sides of the transfer zone are preferably synchronized or tuned to one another in such a way that, when a set glazing unit is transferred from the first train of carriages to the second train of carriages, a carriage is always ready to receive the bent glazing unit.

In a particularly advantageous manner, bending tools known per se for the glazing units may be positioned inside the transfer zone, with which tools these glazing units may, having been bent on the transport supports of the first train of carriages, undergo additional or final bending while they are being transported through the furnace section. By way of bending tools, frame-shaped concave (lower) or convex (upper) bending molds and/or concave (lower) or convex (upper) bending molds with solid surfaces are, for example, known. It is also possible for a lower bending tool to collaborate with an upper bending tool and thus perform a bending step known as pressing. The transport supports of the first train of carriages may also serve as lower molds.

Given that the device of the invention has two trains of carriages separated from one another, in which the carriages bear different transport supports, a transfer device is needed for transferring the glazing units from the first transport supports to the second transport supports. This transfer device is positioned inside the transfer zone. Transfer from the first transport supports to the second transport supports must not be done immediately because the glazing units are molded during a bending operation performed between the time that the glazing units leave the first train and the time they arrive at the second train. By way of transfer device it is possible for example to use the concave-surface transfer mold disclosed in WO 2004/087589. The spread thereof is smaller than the spread of a first frame-shaped transport support which means that it can pass through the latter and thus pick up the panes of glass.

However, particular preference is given to a transfer device that acts as an upper mold, with which the glazing units can be lifted and held by suction on their edge. Such a device is disclosed for example in U.S. Pat. No. 5,713,976 cited in the introduction. This transfer device has a convex bearing surface, with a solid surface or a surface in the form of a frame, for the glazing units, with a periphery that corresponds substantially to the exterior contour of the glazing units. A certain distance from this contour there is a kind of skirt such that a slot is formed through which slot air can be sucked. When positioned under the transfer device and placed on their transport support, the glazing units are sucked, lifted and held as a result of the flow thus created. If the suction forces are high enough and the transfer device has a solid-surface mold-forming bearing surface, the glazing units can be pressed against this upper mold and thus bent.

In another embodiment of the invention, the upper mold acting as a transfer device can be moved horizontally between a position located above a first transport support of the first train of carriages and a position situated above a second transport support of a second train of carriages and, in its travel, transfer the glazing unit lifted up off the first transport support to the second transport support and deposit it thereon.

Aside from the already-mentioned possibility of pressing the glazing units between the upper mold and a lower bending device, which may also be formed by the first transport support, the device of the invention is provided, in a preferred variant, with an additional lower bending mold onto which the glazing units are transferred from the first transport carriage for additional bending by means of the upper mold. Furthermore, near the upper mold there is a second upper mold for transferring the glazing units from the lower mold to a second transport support of the second train of carriages after the bending operation. Aside from its bending function, the lower bending mold also transports the glazing units between the first and second upper mold, alternately occupying a position below each of the two upper molds. The two upper molds may be identical or may differ from one another, for example when one of the molds is used only for lifting and transferring the glazing units and another mold is additionally used for pressing the glazing units against the lower mold. For pressing the glazing units, the upper mold and the lower mold have naturally to be able to move vertically relative to one another.

In particular, bending may be of the type described in international application PCT/FR2005/051093, modified to the extent that a first train of support conveys the glazing units as far as the transfer cell in which said bending is performed, a second train of supports, different from the first, collecting the glazing units and conveying them to the cooling stage.

In a particularly advantageous manner, the device may be provided with a lower mold which has a concave contact surface with a solid surface for the glazing units deposited on it and which is provided with means for producing a pressure difference in order to press the glazing units against the contact surface. The pressure difference in this instance is applied for example by suction through holes or passages pierced in the contact surface. Before or during suction it is possible if need be to perform an additional pressing of the edge or of the complete surface of the glazing units. Such a solid-surface concave mold is disclosed for example in WO 02/064519.

The invention may equally be implemented by carrying out main bending in the transfer cell on the principle disclosed in WO 2004/087590. In this case, a prebending of the sheet of glass under gravity is carried out first of all on a first transport support in the form of a mold of the skeleton type, belonging to the first transport train, then the glass is removed from said first support by a female counterform which rises up, picking up the glass in transit, to then bring it into contact in its central region with an upper male form, then exerting a phase of pressing the glass in its peripheral region between the male form and the female counterform, followed by a suction phase performed on the glass through the male form, with pressure maintained, said suction not being initiated until the first sheet has come into contact with the male form, then pressing is halted by parting the male form from the female counterform, the glass remaining in contact with the male form under the effect of a suction force exerted at least partially by a skirt surrounding the male form, then, while the glass is in contact with the male form under the effect of the suction force, a transport support of the second train for cooling is brought in under the glass, then the suction force is removed so as to allow the glass to rest onto said transport support of the second train, then said transport support of the second train carries the glass away for a glass cooling step outside the bending cell, in the cooling zone.

With the device according to the invention it is just as possible to bend individual glazing units as it is to bend several, particularly two, glazing units positioned one upon the other simultaneously. The condition required for simultaneous bending of a bundle of glazing units is the presence of an appropriate transfer device. The two transfer devices described above in all cases also allow bundles of glazing units to be lifted off the first transport device, held, transferred to a bending device or to the second transport device or transferred from the bending device to the second transport device. For the manufacture of bent laminated glazing units, it is, as a general rule, necessary to bend the individual glazing units simultaneously in a superposed stack.

The device according to the invention can also, at a low cost, be converted to allow it to operate according to the state of the art, and therefore with just one train of carriages and just one type of transport support. In this case, it is simply necessary to provide a possibility for the carriages to run from the furnace section through the transfer zone directly towards the final cooling station.

Other details and advantages of the subject of the invention will become apparent, without the least intention to restrict, from the drawings of exemplary embodiments of bending devices according to the present invention, and from their detailed description which will follow.

In these drawings, which are simplified depictions not drawn to any particular scale.

Figure 1:
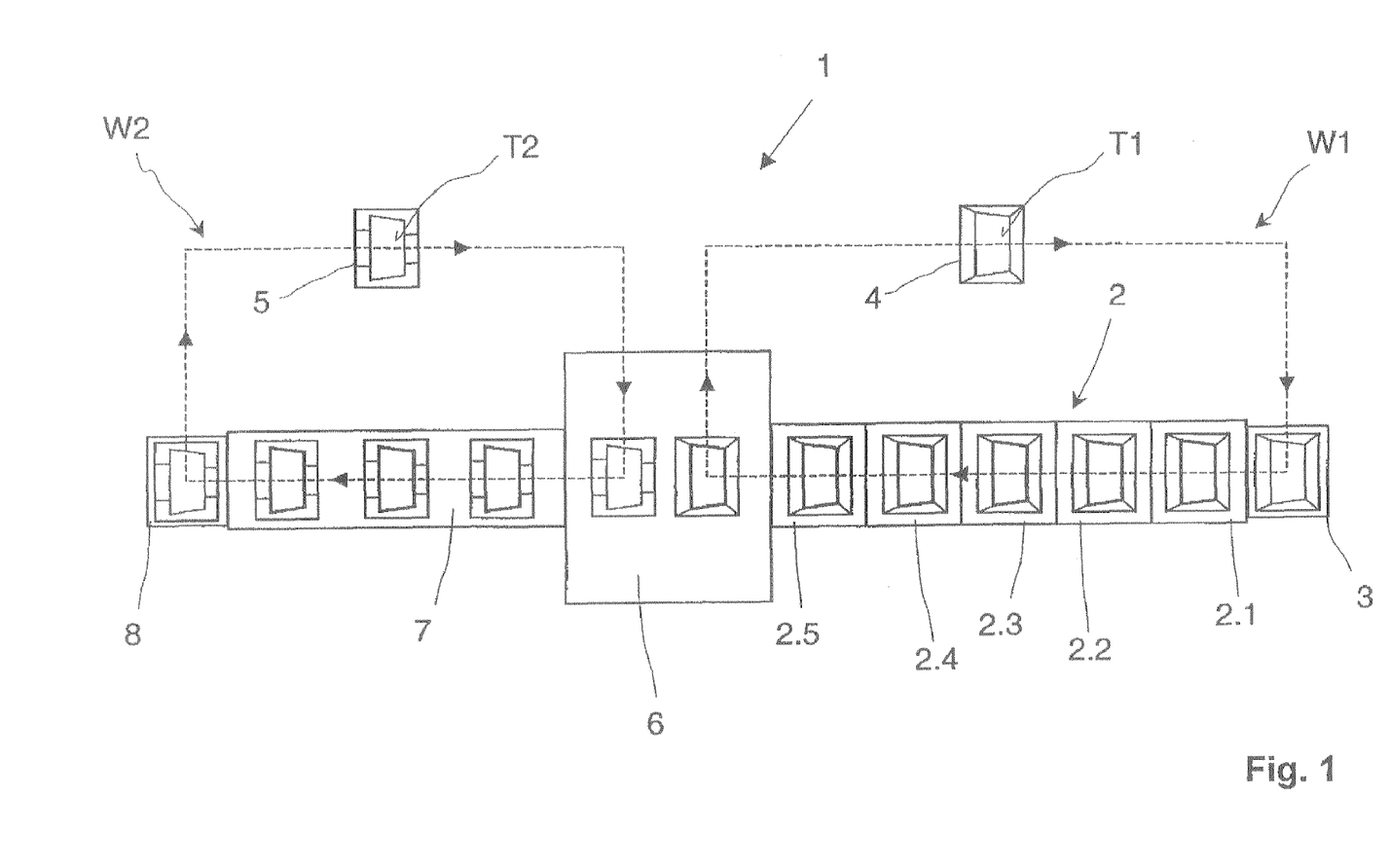
FIG. 1 is a schematic view of a bending device.

According to FIG. 1, a device 1 according to the invention for bending glazing units is made up of a furnace section 2 for heating the glazing units to their softening temperature, preceded by a loading zone 3. The furnace section 2 is made up of several heating zones 2.1 to 2.5 positioned one after the other, with adjustable and separately adjustable heating powers. In this way, the desired temperature profile along the path through the furnace section can be set. After the furnace section 2 there is a transfer zone 6. The carriages 4 run from the loading zone 3 through the furnace section 2 towards the transfer zone 6 then return to the loading zone and thus form a train of carriages W1 in circulation. The individual carriages 4 bear transport supports T1 which can accept the glazing units. The transport supports in this case are in the form of frames for prebending the glazing units under the influence of gravity.

Inside the furnace section 2, the carriages are transported a short distance apart, pushing each other through the various heating zones 2.1 to 2.5, while residing in the various heating zones for a certain length of time.

The return of the carriages 4 here depicted as laterally with respect to the furnace section 2, is not restrictive. Of course, the carriages may also return underneath the furnace section, as described for example in document EP 0 736 498 B1. Such an arrangement may be advantageous from thermal and energy viewpoints.

In the transfer zone 6 in which transport and/or bending tools not depicted here are positioned, the glazing units are taken up off the transport supports T1. After the transfer zone 6, there is a final cooling section 7 which opens into an unloading station 8. The carriages 5 bearing the transport supports T2 form a train of carriages W2, which runs between the transfer zone 6, through the final cooling zone 7 towards the unloading station 8 then once again into the transfer zone 6. The transport supports T2 differ from the transport supports T1 used for prebending. They have a frame-shaped surface for contact with the glazing units which corresponds to the desired contour of the finished bent glazed units. The bending device 1 is therefore equipped with two trains of carriages W1 and W2 separated from one another, the carriages of which are each equipped with different transport supports T1 and T2 for the different steps of the method.

Figure 2:
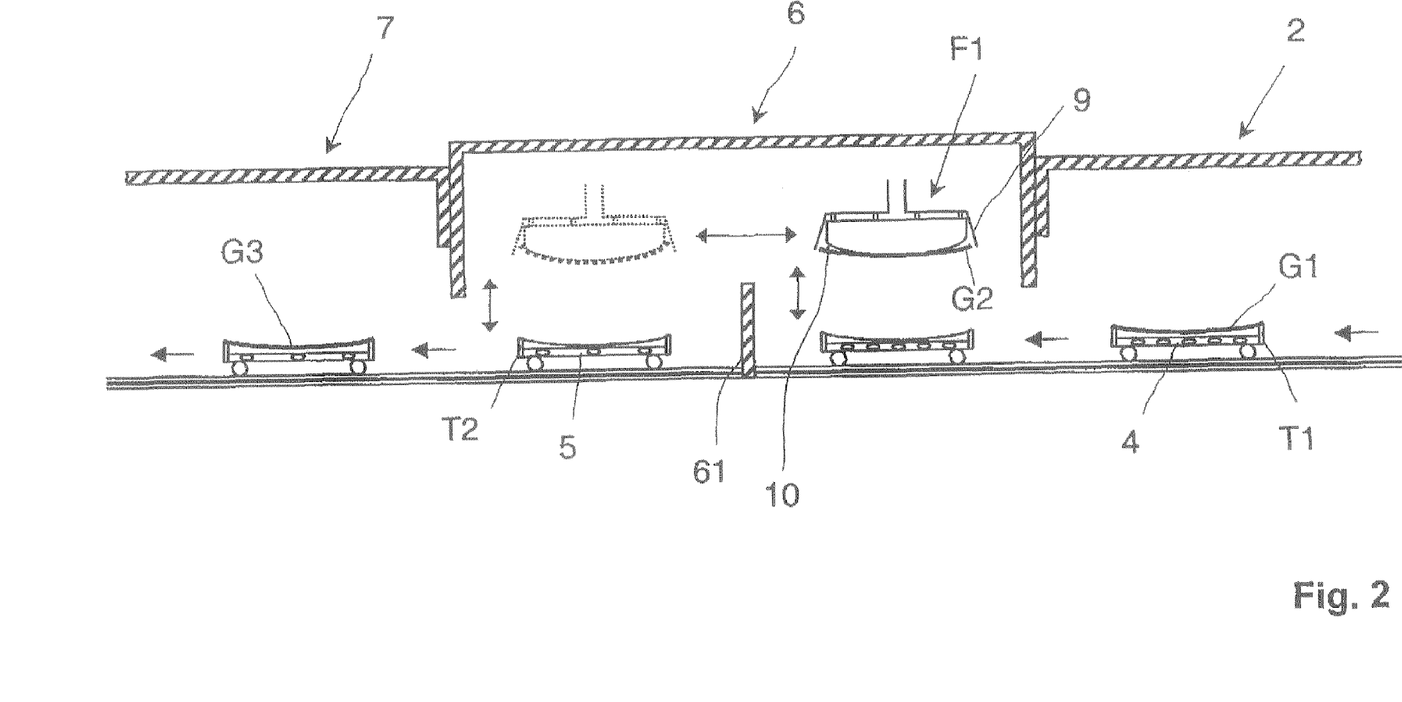
FIG. 2 shows a first embodiment with a transfer device, depicted in section.

FIG. 2 shows a sectioned depiction of a bending device of FIG. 1, in the form of a fragment in the region of the transfer zone 6. A carriage 4 has arrived at the end of the furnace section 2 and on a transport support T1 bears a bundle of already prebent glazing units G1 made up of two superposed glazing units. A previous carriage is in the transfer zone 6 and has already been unloaded by means of an upper mold F1 positioned in the transfer zone.

The mold F1 has a convex and solid molding surface 10 directed downwards, against which a bundle of glazing units G2 has been pressed. Surrounding the molding surface 10 and the sides of the bundle of glazing units G2 there is a skirt 9 forming a peripheral slot. The bundles of glazing units deposited on the transport supports T1 may be lifted and held by sucking air through this peripheral slot. While they are being pressed against the bending surface 10 the bundles of glazing units may be bent to a desired shape because of the pressure difference there is. If need be, the pressure difference can be increased by pulling a vacuum on the glazing units deposited through orifices in the bending surface 10.

The mold F1 can move vertically towards the transport support T1 until it is a short distance away therefrom, to make it easier to receive the bundle of glazing units G2. It is also possible for the bundle of glazing units G2 to be pressed between the transport support T1 and the mold F1 in order to improve the line of bending or to achieve smaller radii of curvature. In its raised position, the mold F1 can be moved horizontally in such a way that it can be positioned over a carriage 5 of the second train of carriages W2 with a transport support T2 positioned above. In the drawing, the mold F1 is depicted in broken line in this position with the bundle of finished bent glazing units. Having moved vertically to a short distance above the transport support T2, the bundle of glazing units is deposited thereon. In the final cooling section 7, there is already another carriage of the train of carriages W2 with a bundle of finished bent glazing units G3 deposited thereon.

The transfer zone 6 is divided into two zones with a thermally insulating wall 61. Thus, the trains of carriages W1 and W2, which may exhibit temperature differences of as much as 250° C., are at least partially thermally separated from one another. For better thermal separation it is also possible to use insulating mobile partitions which completely separate the transfer zone and open up a passage for the mold when needed, by sliding vertically or horizontally.

Figure 3:
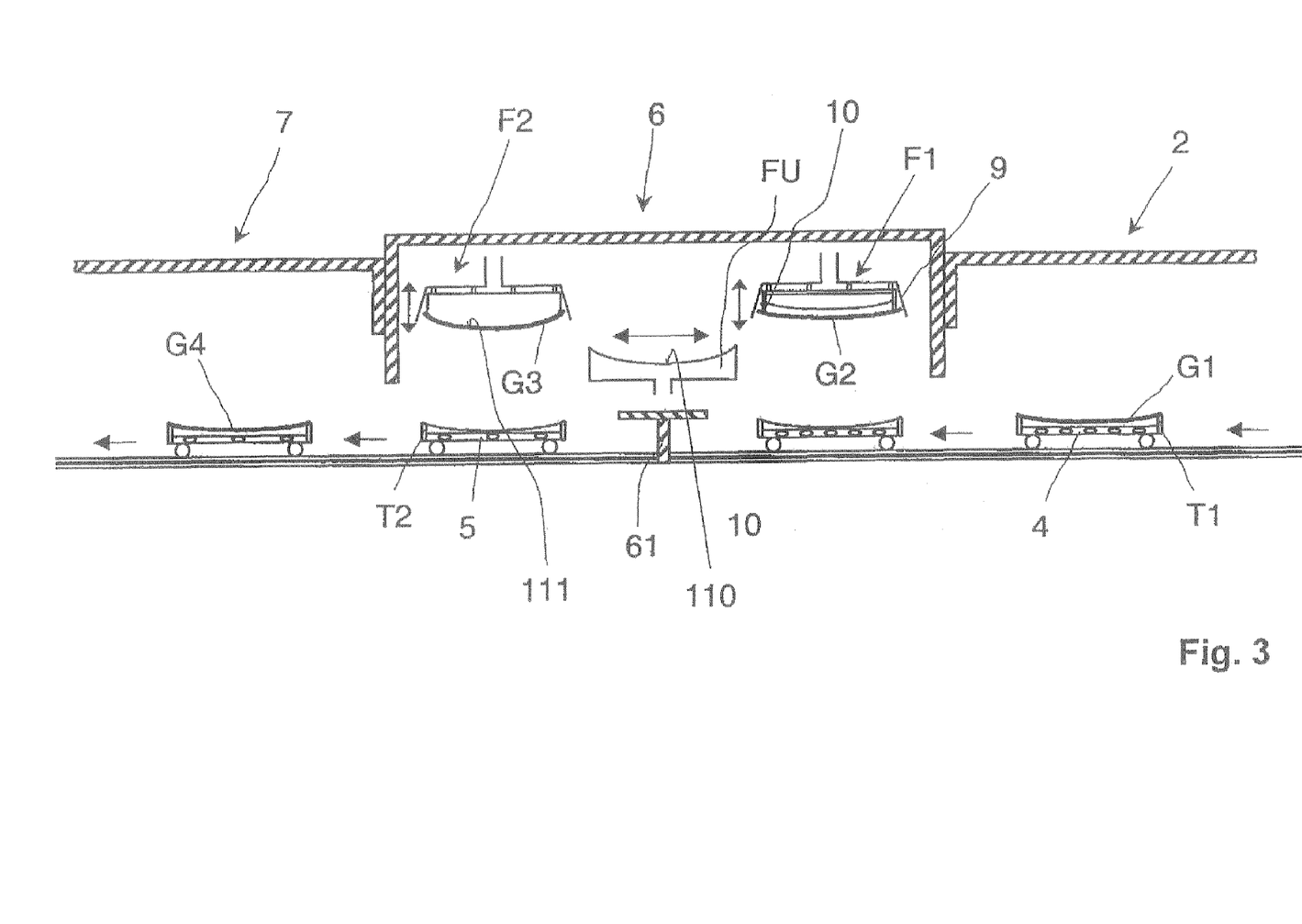
FIG. 3 shows a second embodiment depicted in section, with a lower bending mold employing suction positioned in the transfer zone.

For the sake of simplicity, the guides and drive systems for the mold F1 and the carriages 4 and 5 have not been depicted here and in the description of FIG. 3 which follows.

According to FIG. 3, a variant of the device of the invention is equipped with two upper molds F1 and F2 and with one lower mold FU. The lower mold FU has a solid concave bending surface 110 which is provided with pierced holes or passages, not depicted. Through these orifices it is possible to apply a vacuum to the glazing units resting on the bending surface so that the glazing units press against the bending surface 110 as a result of the pressure difference combined with atmospheric pressure.

The entry and exit of the carriages 4 and 5 and the lifting of the bundles of prebent glazing units and the deposition of the bundles of finished bent glazing units are performed as described in relation to FIG. 2 and will not be returned to in detail here.

The molds F1 and F2 can move only vertically. After the bundle of glazing units G2 has been lifted off the transport support T1 by suction around the peripheral sides and has been held on the bending surface 10 of the mold F1, the lower mold FU moves in a horizontal direction under the mold F1. The mold F1 is then lowered to a short distance above the mold FU and the bundle of glazing units G2 is deposited on the mold FU. At this point, a vacuum acts on the glazing units through the bending surface 110 so that these are pressed against the bending surface 110. If need be, the bundle of glazing units G2 may also be pressed between the molds F1 and FU before or during the time for which the vacuum is in action. Next, the mold FU moves horizontally to under the mold F2, allowing a bundle of finished bent glazing units G3 to be lifted off the mold FU and, once the mold FU has freed the path between the mold F1 and the transport support T2, this bundle can be deposited on the transport support T2 to be transported to the final cooling section 7.

In the embodiment of the bending device according to FIG. 3 also, the transfer zone 6 is divided into two zones via a thermally insulating wall 61. Thus, the trains of carriages W1 and W2, which may exhibit temperature differences of as much as 250° C., are at least partially thermally separated from one another. In this case also, it is possible to make use of insulating mobile partitions for better thermal separation, as already mentioned in the description of FIG. 2.

The molds F1 and F2 differ from one another and are thus suited to different functions.

The mold F1 does not have a solid contact surface 10 but has an annular surface for the bundle of glazing units G2. On the one hand, this is enough to lift, hold and transfer the bundles of glazing units onto the bending mold by bottom suction FU, and on the other hand, the annular shape allows an economical pressing operation in collaboration with the solid-surface mold FU, which is achieved only in the edge region, whereas the desired bending is obtained in the surface lying inside the annular shape, as a result of the pressure difference produced by the mold FU. It is possible as an option to dispense with a "correct" pressing operation because the contact surface 10 of the mold F1 brings only the bundle of glazing units which is positioned on the mold FU against the bending surface 110 of the mold FU, along its peripheral edge, and thus closes off the edge of this mold. In this way, the vacuum acting on the underside of the bundle of glazing units through the orifices in the mold FU can be produced at a lower cost or a greater pressure difference can be achieved for the same cost.

The mold F2 by contrast is provided with a solid convex bending surface 111 corresponding to the final desired degree of curvature of the glazing unit. As a result, the shape of the still-softened glazing units is prevented from changing again during the withdrawal of the mold FU, the holding on the mold F2, and the transfer onto the transport supports T2.

The invention claimed is:

1. A method for bending at least one glazing unit, comprising:
   depositing the glazing units on first transport supports of a first train of carriages at a loading zone;
   transporting the glazing units on the first transport supports of the first train of carriages through a furnace section provided between the loading zone and a first section of a transfer zone such that the glazing units are heated to a bending temperature and bending or prebending the glazing units while transporting the glazing units towards the first section of the transfer zone and the first transport supports of the first train of carriages travel through the furnace section one after the other;

transferring the glazing units from the first transport supports at the first section of the transfer zone onto second transport supports of a second train of carriages at a second section of the transfer zone, the second transport supports being different from the first transport supports; and transporting the glazing units on the second transport supports of the second train of carriages through a final cooling zone provided between the second section of the transfer zone and an unloading station, wherein a temperature of the first section of the transfer zone is different than a temperature of the second section of the transfer zone, wherein a wall or partition provided in the transfer zone separates the first section of the transfer zone from the second section of the transfer zone, wherein the first transport supports include frames for bending or prebending the glazing units by gravity and the second transport supports include a frame-shaped surface which contacts the glazing units and corresponds to a contour of finished bent glazing units, and wherein the first train of carriages travels through the first section of the transfer zone and does not travel through the second section of the transfer zone.

2. The method as claimed in claim 1, wherein, the temperature of the second section of the transfer zone is lower than the temperature of the first section of the transfer zone.

3. The method as claimed in claim 2, wherein a difference in temperature between the second transport supports and the first transport supports lying in the second and first sections, respectively, of the transfer zone is between 100° C. and 250° C.

4. The method as claimed in claim 1, wherein the final cooling section cools the glazing units to a temperature below the bending temperature while transporting the glazing units towards the unloading station.

5. The method as claimed in claim 1, wherein the glazing units are bent using at least one bending tool positioned inside the transfer zone.

6. The method as claimed in claim 5, wherein the glazing units are prebent in a frame-shaped bending mold while transporting between the loading zone and the first section of transfer zone and are bent to their final shape in the transfer zone.

7. The method as claimed in claim 5, wherein the at least one bending tool includes a convex and solid molding surface directed downwards against which surface the glazing units are pressed.

8. The method as claimed in claim 7, wherein a skirt surrounds the molding surface and sides of the glazing units so as to present a peripheral slot.

9. The method as claimed in claim 1, wherein the glazing units are transferred from at least one of the first transport supports to the second transport supports, the first transport supports to the bending tool, or the bending tool to the second transport supports by suction applied to the edges of the glazing units.

10. The method as claimed in claim 1, wherein the glazing unit is bent to its final shape in the transfer zone by suction onto a concave lower mold with a solid surface.

11. The method as claimed in claim 1, wherein two glazing units placed one upon the other and overlapping exactly are bent at a same time.

12. The method as claimed in claim 1, wherein a thermally insulated wall provided in the transfer zone separates the first section of the transfer zone from the second section of the transfer zone, and the glazing units are lifted over the wall when transferred from the first transport supports at the first section of the transfer zone onto the second transport supports at the second section of the transfer zone.

13. A method for bending at least one glazing unit, comprising:

depositing the glazing units on first transport supports of a first train of carriages at a loading zone;

transporting the glazing units on the first transport supports of the first train of carriages from the loading zone towards a transfer zone such that the first transport supports of the first train of carriages travel from the loading zone towards the transfer zone one after the other;

taking the glazing units off the first transport supports in said transfer zone, the carriage being thereafter returned to the loading zone to be loaded with a new glazing unit;

heating the glazing units to a bending temperature thereof and bending or prebending the glazing units during the transporting towards the transfer zone;

transferring the glazing units from the first transport supports at the first section of the transfer zone onto second transport supports of a second train of carriages at a second section of the transfer zone, the second transport supports being different from the first transport supports;

transporting the glazing units on the second transport supports of the second train of carriages through a final cooling zone provided between the second section of the transfer zone and an unloading station such that the glazing units are finished;

taking the finished glazing units off the second transport supports in the unloading station; and returning said second transport supports of the second train of carriages to the transfer zone, wherein, in the transfer zone, a temperature of the second transport supports is lower than a temperature of the first transport supports, wherein a wall or partition provided in the transfer zone separates the first section of the transfer zone from the second section of the transfer zone, wherein the first transport supports include frames for bending or prebending the glazing units by gravity and the second transport supports include a frame-shaped surface which contacts the glazing units and corresponds to a contour of finished bent glazing units, and wherein the first train of carriages travels through the first section of the transfer zone and does not travel through the second section of the transfer zone.

14. The method as claimed in claim 13, wherein a difference in temperature between the second transport supports and the first transport supports lying in the second and first sections, respectively, of the transfer zone is between 100° C. and 250° C.

15. The method as claimed in claim 13, wherein the final cooling section cools the glazing units to a temperature below the bending temperature while transporting the glazing units towards the unloading station.

16. The method as claimed in claim 13, wherein the glazing units are bent using at least one bending tool positioned inside the transfer zone.

17. The method as claimed in claim 13, wherein the glazing units are prebent in a frame-shaped bending mold while transporting between the loading zone and the first section of transfer zone and are bent to their final shape in the transfer zone.

18. A method for bending at least one glazing unit, comprising:
- depositing the glazing units on a first transport support of a first train of carriages at a loading zone;
- transporting the glazing units on the first transport support of the first train of carriages through a furnace section provided between the loading zone and a first section of a transfer zone such that the glazing units are heated to a bending temperature and bending or prebending the glazing units while transporting the glazing units towards the first section of the transfer zone;
- transferring the glazing units from the first transport support at the first section of the transfer zone onto a second transport support of a second train of carriages at a second section of the transfer zone, the second transport support being different from the first transport support; and
- transporting the glazing units on the second support of the second train of carriages through a final cooling zone provided between the second section of the transfer zone and an unloading station,
- wherein the transfer zone is disposed between the furnace section and the final cooling zone,
- wherein a temperature of the first section of the transfer zone is different than a temperature of the second section of the transfer zone,
- wherein a wall or partition provided in the transfer zone separates the first section of the transfer zone from the second section of the transfer zone,
- wherein the first transport support includes frames for bending or prebending the glazing units by gravity and the second transport support includes a frame-shaped surface which contacts the glazing units and corresponds to a contour of finished bent glazing units, and
- wherein the first train of carriages travels through the first section of the transfer zone and does not travel through the second section of the transfer zone.

19. A method for bending at least one glazing unit, comprising:
- depositing the glazing units on a first transport support of a first train of carriages at a loading zone;
- transporting the glazing units on the first transport support of the first train of carriages from the loading zone through a furnace section towards a transfer zone;
- taking the glazing units off the first transport support in said transfer zone, the carriage being thereafter returned to the loading zone to be loaded with a new glazing unit;
- heating the glazing units to a bending temperature thereof and bending or prebending the glazing units during the transporting in the furnace section towards the transfer zone;
- transferring the glazing units from the first transport support at the first section of the transfer zone onto a second transport support of a second train of carriages at a second section of the transfer zone, the second transport support being different from the first transport support;
- transporting the glazing units on the second support of the second train of carriages through a final cooling zone provided between the second section of the transfer zone and an unloading station such that the glazing units are finished;
- taking the finished glazing units off the second transport support in the unloading station; and
- returning said second transport support of the second train of carriages to the transfer zone,
- wherein the transfer zone is disposed between the furnace section and the final cooling zone,
- wherein, in the transfer zone, a temperature of the second transport support is lower than a temperature of the first transport support,
- wherein a wall or partition provided in the transfer zone separates the first section of the transfer zone from the second section of the transfer zone,
- wherein the first transport support includes frames for bending or prebending the glazing units by gravity and the second transport support includes a frame-shaped surface which contacts the glazing units and corresponds to a contour of finished bent glazing units, and
- wherein the first train of carriages travels through the first section of the transfer zone and does not travel through the second section of the transfer zone.

20. A method for bending at least one glazing unit, comprising:
- depositing the glazing units on a first transport support of a first train of carriages at a loading zone;
- transporting the glazing units on the first transport support of the first train of carriages through a furnace section provided between the loading zone and a first section of a transfer zone such that the glazing units are heated to a bending temperature and bending or prebending the glazing units while transporting the glazing units towards the first section of the transfer zone;
- transferring the glazing units from the first transport support at the first section of the transfer zone onto a second transport support of a second train of carriages at a second section of the transfer zone, the second transport support being different from the first transport support; and
- transporting the glazing units on the second support of the second train of carriages through a final cooling zone provided between the second section of the transfer zone and an unloading station,
- wherein a temperature of the first section of the transfer zone is different than a temperature of the second section of the transfer zone, and
- wherein the first transport support includes frames for bending or prebending the glazing units by gravity and the second transport support includes a frame-shaped surface which contacts the glazing units and corresponds to a contour of finished bent glazing units,
- wherein a thermally insulated wall provided in the transfer zone separates the first section of the transfer zone from the second section of the transfer zone, and
- the glazing units are lifted over the wall when transferred from the first transport support at the first section of the transfer zone onto the second transport support at the second section of the transfer zone.

* * * * *

UNITED STATES PATENT AND TRADEMARK OFFICE
CERTIFICATE OF CORRECTION

| | | |
|---|---|---|
| PATENT NO. | : 8,327,667 B2 | Page 1 of 1 |
| APPLICATION NO. | : 11/813690 | |
| DATED | : December 11, 2012 | |
| INVENTOR(S) | : Michael Balduin et al. | |

It is certified that error appears in the above-identified patent and that said Letters Patent is hereby corrected as shown below:

Cover Page, (75) Inventors, change "Karl-Josef Ollfisch, Aachen (DE)" to --Karl-Josef Ollfisch, Roetgen (DE)--;

Cover Page, (75) Inventors, change "Guenther Schall, Aachen (DE)" to --Guenther Schall, Kreuzau (DE)--;

Column 1, line 66, change "the invention this" to --the invention, this--;

Column 4, line 7, change "by wheels air cushions" to --by wheels, air cushions--;

Column 4, line 11, change "in particular the mass" to --in particular, the mass--; and Column 6, line 57, change "carriages 4 here depicted" to --carriages 4, here depicted--.

Signed and Sealed this
Nineteenth Day of March, 2013

Teresa Stanek Rea
*Acting Director of the United States Patent and Trademark Office*